Figure 1:
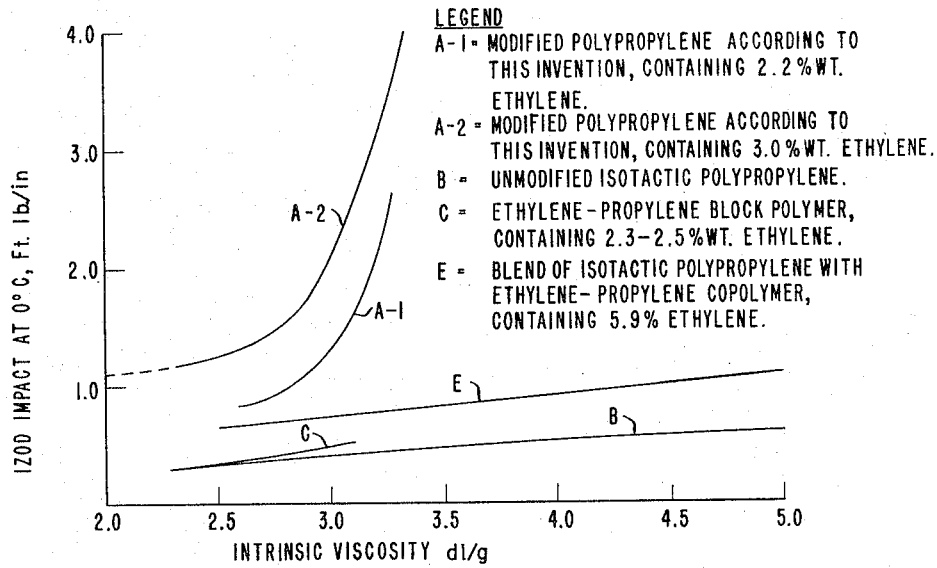

Jan. 31, 1967 G. A. SHORT 3,301,921
ISOTACTIC POLYPROPYLENE MODIFIED WITH
ETHYLENE-PROPYLENE COPOLYMER
Filed March 28, 1962

INVENTOR:
G. A. SHORT
BY: *Martin S. Baer*
HIS ATTORNEY

United States Patent Office 3,301,921
Patented Jan. 31, 1967

3,301,921
ISOTACTIC POLYPROPYLENE MODIFIED WITH ETHYLENE-PROPYLENE COPOLYMER
Glen A. Short, Concord, Calif., assignor to Shell Oil Company, New York, N.Y., a corporation of Delaware
Filed Mar. 28, 1962, Ser. No. 183,145
4 Claims. (Cl. 260—878)

This application is a continuation-in-part of Serial No. 77,776, filed December 22, 1960, now abandoned.

This invention relates to an improved polypropylene product.

Polypropylene is a new thermoplastic polymer which has reecntly achieved commercial importance. It is produced by polymerizing propylene at temperatures ranging from about 20° to about 150° C. and pressures below about 500 p.s.i.g. The catalysts used in the polymerization are generally designated low-pressure polymerization catalysts. Broadly, they are formed from a transition metal halide and a metal organic compound. By careful selection of catalyst and operation conditions it is possible to produce stereospecific polymers.

In polypropylene every second carbon atom is asymmetric, being bound not only to a chain carbon atom on either side but to one hydrogen and one methyl group. When a portion of the polypropylene chain is thought of as arranged in such a way that the hydrogens of the —$CH_2$— groups lie in a given plane, then the following arrangements can be visualized: (1) all the hydrogen atoms bound to the asymmetric carbons lie above that plane and all the methyl groups attached to the asymmetirc carbons below that plane or vice versa; (2) the hydrogens and methyl groups of consecutive asymmetric carbon atoms lie in opposite planes from each other; (3) the order in which the hydrogen and methyl group lie above and below the plane is random. These possible arrangements have been named "isotactic," "synodiotactic" and "atactic," respectively.

A number of stereospecific polymerization catalysts have been described in the literature. These include catalysts which produce polypropylene characterized by a high proportion of isotactic content. The present invention is concerned with improved, modified isotactic polypropylene and its preparation.

It is difficult, if not impossible to polymerize propylene to a polymer which has 100% isotactic structure. However, it is possible to produce with commercially practical catalysts polymers which have an extremely high proportion of segments that are completely isotactic. Properties which are associated with high isotacticity of polypropylene are a high degree of crystallinity or crystallizability and a high proportion of material which is not soluble in hydrocarbon solvent at room temperature or moderately elevated temperatures. Highly isotactic polypropylene has the desirable characteristics of having a high tensile strength and substantial hardness. All these properties decrease with decreasing isotactic content. A disadvantage of polypropylene in commercial ranges of isotacticity is its brittleness and low impact resistance at relatively low temperatures, such as 0° C. and below. This severely handicaps the applicability of highly isotactic polypropylene to uses such as vessel or containers which during use may be subject to mechanical shock, particularly at low ambient temperatures. The impact resistance at 20° C. and above is moderately good for polypropylene of moderately high isotacticity but decreases with increasing crystallinity.

The properties of polypropylene are also affected by its molecular weight. The quantity which is usually employed as an indication of molecular weight of polypropylene is the so-called intrinsic viscosity (I.V.), measured in decalin at 150° C. and expressed in dl./g. The intrinsic viscosity of isotactic polypropylene can vary from 0.3 or less to 20 or more. The intrinsic viscosity of general purpose grades of polypropylene is generally between 2 and 3.5. Injection grades of polypropylene, i.e., those which are to be fabricated into articles by injection molding, desirably have an intrinsic viscosity in the range from 2.3 to 2.5. For the production of pipe, intrinsic viscosities of the order of 5 are satisfactory.

The impact resistance of polypropylene is suitably tested by ASTM Standard Method D256–56 for impact resistance of plastics, using the Izod type test (Method A). The test measures the energy expended by a pendulum in breaking with one blow a standard notched test strip. The results are reported as foot pounds per inch of notch, which is commonly shortened to "foot pounds per inch" and abbreviated "ft. lb./in." To measure the impact resistance at 0° C., as used in this specification, the test specimen is conditioned for at least four hours in an ice water slush and is placed on the impact machine and tested within 30 seconds, preferably within 10 seconds after removal from the cold bath.

Low temperature impact resistance of polypropylene increases with increasing intrinsic viscosity, as will be illustrated hereafter. Hence, polymer of moderately high impact resistance, even at very high isotacticity, can be produced if one is willing to go to a high enough I.V. However, polypropylene of high I.V. presents difficulties in the manufacturing process and may therefore not be commercially acceptable or competitive.

The problem which led to this invention was the need for a polypropylene product which retains a substantial part of the high tensile strength which is associated with high isotacticity and which nevertheless has an unusually high impact resistance at low temperatures and also has a molecular weight in the commercially desired range.

It is an object of this invention to provide a modified, specially structured polypropylene product characterized by improved low temperature impact resistance and retention of satisfactory tensile strength at intrinsic viscosities in the range from 2 to 6 dl./g. It is a specific object to provide modified polypropylene product having a tensile yield strength, measured at 0.2 in./min., of at least about 3000 p.s.i. and an Izod Impact value at 0° C. of at least 0.75 ft. lb./in. notch at I.V. values between 2 and 3 dl./g., and at least 1 ft./in. at I.V. values between 3 and 3.5 dl./g. and at least 2 ft. lb./in. at I.V. values above 3.5 dl./g. Other objects will appear from the following description of the invention.

The novel specially structured, modified polypropylene product of this invention, which has high crystallinity and high impact strength at low temperatures, can be made by polymerizing propylene by contact with a highly stereospecific catalyst system, adding to the reaction mixture a controlled amount of ethylene after the polymerization has been nearly completed, continuing the polymerization in the presence of ethylene and propylene until the polymer product contains a small amount of combined ethylene, stopping the polymerization reaction at that point and recovering the modified polypropylene product.

The polymerization process can be suitably carried out with any highly stereospecific catalyst system at reaction conditions which lead to the production of polypropylene of very high isotacticity. A great variety of stereospecific catalysts have been described in the literature. Known effective catalysts are species or modifications of the so-called Ziegler catalyst; that catalyst consists, broadly, of two-component systems comprising a compound of the left hand subgroups of Groups IV–VI or Group VIII of the Mendeleev Periodic Table, as illustrated on page 28 of Ephraim, "Inorganic Chemistry," 6th English edition, and a Group I–III element or alloy or hydride or organic derivative having an organometallic bond. Suitable catalysts can be selected from the references listed on pages 350 to 361 of "Linear and Stereoregular Addition Polymers" by Gaylord and Mark, Interscience Publishers, Inc., New York, 1959.

The most effective catalysts for the production of isotactic polypropylene known to date are those comprising titanium trichloride and certain aluminum alkyls and aluminum alkyl halides. The titanium trichloride used in such catalysts may be the result of reduction of titanium tetrachloride during the course of catalyst preparation. In the preparation of particularly highly stereospecific catalysts, titaium trichloride is prepared by reducing titanium tetrachloride by contact with aluminum triethyl or another aluminum trialkyl and thereafter using the total reaction product of this first reaction step with sufficient aluminum triethyl or aluminum diethyl chloride to give a total aluminum to titanium mole ratio of at least 1:1. Preferred aluminum to titanium mole ratios are in the range from 2:1 to 3:1, but ratios up to 4:1 or 5:1 are sometimes used, and still higher ratios may be used, if desired. These preferred catalyst, as well as other useful Ziegler catalyst, are described in more detail in U.S. Patents 3,147,238 and 2,971,925 to Winkler et al. The disclosures of said patents, insofar as they refer to polymerization catalysts, are included herein by reference.

The conditions under which the reaction takes place are conventional for the polymerization of propylene. The pressure is generally between atmospheric and 500 p.s.i. It is in part a function of the temperature and of the solvent employed. The temperature is in the range from 0 to 120° C., and preferably from 25° to 70° C. At lower temperatures in these ranges the isotacticity of the product is higher, but the reaction rate is lower. In selecting a reaction temperature, a compromise is struck between these two effects. A particularly suitable temperature is generally between 50° and 60° C. The reaction is carried out in a solvent medium in liquid phase. The medium may be any hydrocarbon from propane up to paraffinic fractions in the gasoline or kerosene boiling range.

Compounds which modify the action of the catalyst may be present in the reaction mixture. For example, hydrogen or zinc diethyl or other zinc alkyl may be added to limit the molecular weight of the polymer. Compounds which tend to increase the crystallinity of the polymer may be added, such as tributyl phosphite, ethyl acetate, dimethyl formamide, and the like. The use of these and other additives has been taught and they can be used in amounts and in a manner known to produce the desired effects.

In a preferred mode of preparing the modified polypropylene product of this invention propylene is polymerized with a suitable catalyst under suitable conditions for stereospecific polymerization until from about 90 to about 95% of the desired propylene conversion has been obtained. This conversion is usually a function of the maximum concentration of solid polypropylene particles in the reaction mixture which can be handled in a practical manner. A suitable range of final polymer concentration is from 5 to 30% by weight, based on the reaction mass, with 10 to 20% being preferred. After the desired proportion of total propylene conversion has been attained, ethylene is added to the reaction mixture in controlled proportion relative to propylene and the reaction is continued until the desired total conversion has been attained. At that time, the reaction is stopped and the product recovered.

The point at which the reaction is to be terminated in order to produce a polymer having the desired ethylene content can be determined from experience obtained in other runs under a given set of conditions or it can be determined by sampling the reaction mixture and determining the ethylene content of the polymer at any given time.

The reaction is terminated in well known manner, e.g., by adding a polar liquid such as an alcohol to the reaction mixture. The work-up of the polymer product can be carried out in the manner which is well known for the production of polypropylene.

In an alternative method the copolymerization of ethylene and propylene is carried out as the first step. In that modification a mixture of ethylene and propylene is reacted with a stereospecific catalyst suitable also for the production of isotactic polypropylene until about the desired amount of copolymer has been produced; the vapor space of the reactor is then evacuated to remove unconverted monomer and the liquid reaction mixture is held at reaction conditions to assure complete conversion of monomers to copolymer; propylene is finally added and polymerized until the ethylene content of the total product is in the desired low range. Products produced in this manner differs somewhat in properties from that produced according to the first described preferred method; however, it has a desirably high impact strength at low temperatures and consists predominantly of uninterrupted polypropylene chains having attached to the ends of many, if not all, of the chains a portion of ethylene-propylene copolymer. This method is further illustrated in Example 2.

A characteristic of all methods suitable for producing the product of this invention is that the homopolymerization and the copolymerization are both carried out with the identical catalyst. No catalyst killing step intervenes between the two reaction steps. If the two steps are to be carried out in separate vessels, the reaction mass which is transferred includes both polymer and catalyst.

The remainder of the process description will be concerned mainly with the first described preferred mode of producing the novel product of this invention.

The preferred polymerization process can be carried out in a batch reactor or in continuous manner. In batch reaction the polymerization is carried out exactly as conventional propylene polymerization until at least about 90% of the desired amount of propylene has been polymerized; at that time ethylene is added to the reaction mixture. Batch reactions are usually carried out in an agitated vessel in which additional olefin monomer is added as the olefin supply is depleted. In the process of this invention, ethylene may be added in admixture with propylene at the time at which ethylene addition is to be commenced, or ethylene and propylene may be added as separate streams.

If the preferred process is to be carried out in a continuous manner then it is suitable to produce the polypropylene in the same way in which it would otherwise be produced in a continuous process. Such a process is described for example in Serial No. 780,985 of Schwaar et al., filed December 17, 1958, now abandoned. In one mode of the process a plurality of reactors are operated with series flow of polymer slurry from one reactor to the next and with separate olefin feed to each of the reactors. In modifying such a process for preparing the product of this invention according to the preferred method, the polymerization is controlled in such a manner that propylene polymerization is carried out in all but the last reactor in series and in that reactor a mixture of ethylene and propylene is charged in order to provide the final amount of polymerization which introduces the desired amount of ethylene. If desired, only two reactors may be used, the first to produce polypropylene and the second to complete the polymerization in the presence of ethylene.

The manner in which ethylene addition is controlled to achieve the product of this invention depends on the type of reaction system employed. It is known that ethylene is substantially less soluble in paraffinic hydrocarbon solvents than propylene. On the other hand, the rate of polymerization of ethylene in the presence of stereospecific catalysts is very much higher than the rate of polymerization of propylene. These two factors working in opposition to each other permit a reasonable control of the polymerization.

An illustrative method discussed in more detail in Example 1 below is one suitable for batch reaction. During the propylene polymerization the rate of addition of propylene is controlled at a known value. Then, when at least about 90% of the desired concentration of polypropylene in the reaction mixture has been obtained, the rate of propylene addition is reduced and ethylene is added at a rate equal to or lower than the rate of propylene addition. The ratio of ethylene to propylene addition rates may be between 0.01:1 and 1:1.

In a continuous system in which polypropylene is produced in one or a plurality of reactors and the slurry which contains polypropylene and catalyst is then passed to another reactor in which there is both propylene and ethylene present, the desired result can be achieved by controlling the ratio of ethylene to propylene in the feed to the second reactor and the residence time of the slurry in the reactor. The ratio of ethylene to propylene in the final reaction zone of a continuous process is suitably in the range from 0.01:1 to 1:1.

The preferred, specially structured modified polypropylene of this invention, suitably prepared as just described, contains from 1 to 8% by weight of ethylene units. For best results, the reaction is controlled to produce a polymer containing at least 2% and preferably no more than 5% by weight of ethylene units. At ethylene concentrations above about 5% the tensile strength of the product begins to decrease significantly. At ethylene concentrations below about 1% the improvement in impact resistance is not sufficient to result in a commercially desirable product and for practical purposes a minimum ethylene concentration of 2% is generally preferred.

Polypropylene polymer products prepared as described and having high ethylene contents, e.g., in excess of 8% by weight, are useful as blending stocks for blending into conventional isotactic polypropylene, as described in my copending application Serial No. 183,012 filed of even date herewith. A suitable range of ethylene contents in blending stock is from 2 to 20% by weight; a preferred range is from 4 to 10%. The above described methods which are suitable for producing the preferred, specially structured copolymers of this invention are also suitable for producing similarly structured blending stocks of higher ethylene contents.

The copolymer formed during the period in which ethylene is present in the reactor in the above described methods is believed to be a copolymer of ethylene and propylene containing between 10 and 90% by weight ethylene units, and preferably about 20 to 50%. It is believed that this copolymer grows largely on the ends of existing polypropylene molecules.

Regardless of what the chemical arrangement may be, product of this invention, made as described, differs substantially in characteristics from and is, in fact, greatly superior to product made by merely admixing polypropylene and conventional rubbery ethylene-propylene copolymer in proportions which result in similar ethylene contents, or by copolymerizing ethylene with propylene in the same proportions, but in different manner from that described.

Figure 2:
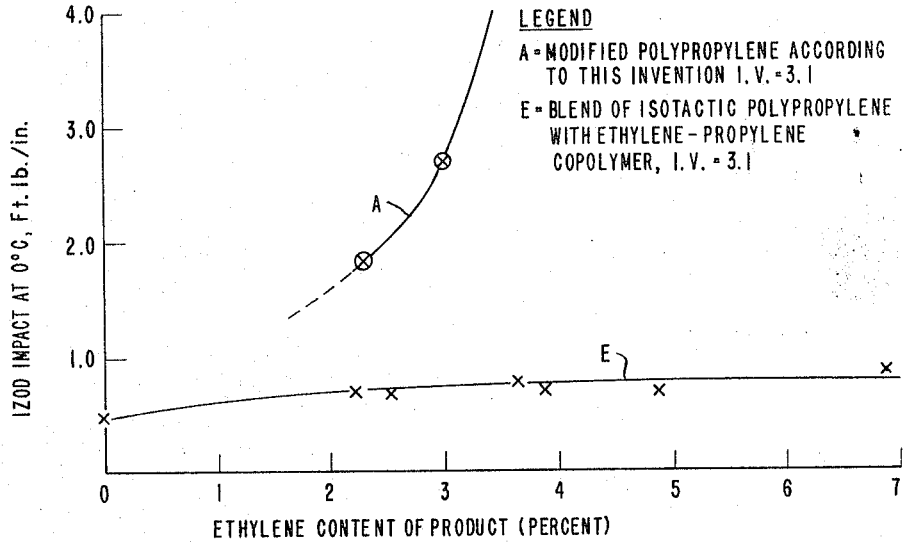

This is further illustrated by reference to the drawing, in which FIGURE 1 is a plot of the variation of 0° C. Izod Impact with intrinsic viscosity for various polypropylene products of fixed ethylene content, and FIGURE 2 is a plot of the variation of 0° C. Izod Impact with ethylene content for various polypropylene product of fixed intrinsic viscosity. The products illustrated in FIGURES 1 and 2 are described in some detail in Example 3.

From inspection of FIGURE 1 it is immediately apparent that products A-1 and A-2, typical products according to this invention, show a tremendous increase in low temperature impact strength with increasing molecular weight compared with conventional isotactic polypropylene, product B. Product C, an ordinary block polymer of propylene and ethylene, having an ethylene content comparable to product A-2, is not significantly better than plain polypropylene. Product E, a blend of polypropylene with conventional rubbery ethylene-propylene copolymer, is somewhat better, but still greatly inferior to the product of this invention.

FIGURE 2 illustrates that for product A, modified polypropylene of this invention having a fixed intrinsic viscosity, the 0° C. Izod Impact strength increase significantly with ethylene content. Product E, prepared by milling isotactic polypropylene with conventional rubbery ethylene-propylene copolymer, shows practically no increase in impact strength with ethylene content when compared with the increase shown by Product A.

In preparing the modified polypropylene products of this invention, the degree of isotacticity is determined by the choice of catalyst and reaction conditions, including reactant purity. These effects are known. Significant variables that can be altered deliberately are the intrinsic viscosity of the product and the ethylene content. As ethylene content is increased there is some decrease in tensile yield strength of the product, though this is not very much until the preferred upper limit of 5% ethylene is exceeded. It is evident from FIGURES 1 and 2 that satisfactory product of at least 0.75 ft. lb./in. 0° C. Izod Impact can be obtained even at intrinsic viscosities as low as 2 by using a moderately high ethylene content. In general, for a desired I.V. of the product, the lowest amount of ethylene will be added which provides the required impact strength.

Since the products of this invention essentially consist of polypropylene having a small amount of ethylene contained therein they are generally referred to in this application as "modified polypropylene," or "modified polypropylene product." Having reference to the fact that ethylene is incorporated in polypropylene in accordance with this invention in a novel and unusual chemical structure, the product is also referred to as "modified, specially structured polypropylene product."

The physical properties of the polypropylene products of this invention are in the ranges representative of isotactic polypropylene in general, except for certain superior properties, particularly resistance to impact at low temperatures, which result from the fact that the polypropylene product of this invention is specially structured, as described. The product partakes of the chemical properties of polypropylene, including great stability to attack by various chemicals but some sensitivity to deterioration both under the influence of oxygen and heat and under the influence of actinic radiation.

Conventional methods of modifying polypropylene for various commercial purposes are applicable to the modified polypropylene product of this invention. This includes the use of oxidation inhibitors or heat stabilizers, ultraviolet stabilizers, flow promoting additives, slip additives, antistatic additives, pigments, fillers, and the like. Selection can be made from the great variety of materials of these various classes which are known to the art. The selection of an individual additive will not ordinarily be affected by the difference of the modified polypropylene products of this invention from the conventional polypropylene products.

It is particularly advantageous to incorporate into modified polypropylene compositions of this invention a small amount of a crystal modifying agent of the class generally referred to as nucleating agents. The addition of a small amount of such materials often results in substantial further increases in the resistance of the product to impact at low temperatures. Particularly useful crystal modifying compounds for this purpose are certain carboxylic acids, their anhydrides and their aluminum salts. Particularly suitable carboxylic acids may be classified as (a) di-or polycarboxylic acids or their anhydrides, sometimes referred to herein for brevity as di-carboxylic acid type compounds;
(b) monocarboxylic acids which contain ring structures, or their anhydrides;
  (1) monocarboxylic acids having the carboxyl group attached to a ring carbon atom or their anhydrides (sometimes referred to herein for brevity as benzoic acid type compounds);
  (2) monocarboxylic acids having the carboxyl group attached to an aliphatic carbon atom and the ring attached to another aliphatic carbon atom (sometimes referred to herein, for brevity, as arylalkanoic acid type compounds).

The aluminum salts of these acids which may be used may be neutral aluminum salts of the acids or they may be basic salts having up to two OH groups per aluminum atom.

Typical dicarboxylic acid type compounds which may be used as nucleating agents in the form of acids, anhydrides, or aluminum salts, are saturated aliphatic dicarboxylic acids, preferably having at least 4 carbon atoms per molecule, e.g., succinic, glutaric, adipic, suberic, sebacic and tetramethyladipic acid; saturated cycloaliphatic dicarboxylic acids such as cis-1,4-cyclohexanedicarboxylic acid, 1,2-cyclohexanedicarboxylic acid and 1,1-cyclohexanedicarboxylic acid; aromatic dicarboxylic acids such as orthophthalic acid, metaphthalic acid and tetramethylterephthalic acid; aryl-substituted aliphatic dicarboxylic acids such as paraxylylsuccinic acid and 3-phenylbutanedicarboxylic acid; and polycarboxylic acids such as pyromellitic acid.

Suitable benzoic acid type compounds are benzoic acid itself, hexahydrobenzoic acid, substituted benzoic and hexahydrobenzoic acid, and heterocyclic monocarboxylic acids whose carboxyl group is attached to a ring carbon atom. Among the substituted acids, those with one to six carbon atoms per substituent group are preferred, especially those with alkyl substituents. Typical are o-methylbenzoic acid, p-methylbenzoic acid, p-ethylbenzoic acid, p-isopropylbenzoic acid, p-tert.butylbenzoic acid and o-tert.butylbenzoic acid; also useful are 2,4-dimethylbenzoic acid and 2,4,6-trimethylbenzoic acid, alpha naphthoic acid and p-cyclohexylbenzoic acid; corresponding alicyclic compounds are for example cyclohexane carboxylic acid, 1-methylcyclohexane carboxylic acid, cis-4-tert.butyl cyclohexane carboxylic acid, cis-4-neopentylcyclohexane carboxylic acid, trans-4-methylcyclohexane carboxylic acid and trans-4-tert.butyl cyclohexane carboxylic acid; heterocyclic acids include pyromucic acid and isonicotinic acid; other useful acids are those containing a polar group or atom substituted on the nucleus such as meta- or para-hydroxybenzoic acid, ortho- or parachlorobenzoic acid, m-nitrobenzoic acid, 3,5-dinitrobenzoic acid, ortho- or para-aminobenzoic acid, p-acetamidobenzoic acid, o-formylbenzoic acid and p-methoxybenzoic acid; the anhydrides and aluminum salts of the above named acids are also effective.

Effective alkanoic acid type crystal modifying additives are those having the general formula

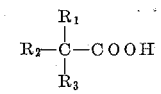

in which $R_1$ is an aryl, arylalkyl, arylalkenyl, cycloalkyl, cycloalkalkyl or cycloalkalkenyl group wherein the ring does not itself contain a carboxylic acid group. $R_2$ and $R_3$ may be substituents of the type $R_1$ or they may be aliphatic hydrocarbon groups or hydrogen. The compounds may be generically designated carbocyclic ring-substituted acetic acids or carbocyclic ring-substituted aliphatic monocarboxylic acids having the carboxyl group attached to a terminal aliphatic carbon atom. The preferred acids contain from 8 to 25 carbon atoms, including from 1 to 4 carbon atoms in the alkyl group attached to the carboxyl group. They may also carry as substituents a hydroxyl group, an amino group or a halogen atom. Effective compounds include phenyl acetic acid, diphenyl acetic acid, beta,beta-diphenylpropionic acid and beta-phenyl-beta-methylbutyric acid; others are alpha-phenyl-alpha-methylpropionic acid, beta,beta,beta-triphenylpropionic acid, beta,beta,beta-tri(p-tert.butylphenyl)-propionic acid and beta-p-tolyl-beta-methylbutyric acid; others are p-nitrophenylacetic acid and beta(p-aminophenyl) beta-methylbutyric acid; others are beta,beta-di(p-tert.butylphenyl)alpha-hydroxypropionic acid and benzilic acid; others are cyclohexylacetic acid, beta-cyclohexylpropionic acid and beta-cyclohexylbutyric acid; the aluminum salts of these acids are effective nucleating agents.

Effectiveness of the above named carboxylic acid or anhydride nucleating agents is obtained only in polymer products containing at least a small amount of residue of the transition metal-aluminum organic compound catalyst. In order for the above disclosed acid crystal modifying additives to be fully effective, the polymer should contain at least 50 p.p.m. of the residue of at least one of the catalyst components, calculated as the corresponding metal. The aluminum salts are equally effective in polymers containing no such catalyst residues.

Suitable concentrations of the above named acidic crystal modifying agents in the final polymer product are in the range from 0.05 to 5% by weight. A preferred lower concentration limit is about 0.1%. The most effective acidic compounds are preferably employed in concentrations below 1%, e.g., between 0.1 and 0.5 or up to 0.8%. Other acidic compounds may be used in amounts up to 1 or 2% or more. The aluminum salts of carboxylic acids are effective in lower concentrations than the acids themselves. Suitable concentrations are in the range from 0.0001 to 1% by weight. A preferred lower concentration limit is about 0.001%. The most effective compounds are preferably employed in concentrations below 0.5%, e.g., between 0.001 and 0.3 or up to 0.5%. Other compounds may be used in amounts up to 1%. Most of the preferred aluminum salts have aluminum contents in or near the range from 5 to 10% by weight. The amount of aluminum added to the polymer product due to addition of said aluminum salts in the preferred concentrations is generally in the range from 0.00005 to 0.05% by weight.

Useful improvements may also be obtained by addition of other crystal modifying additives, such as suitable amounts of finely divided solids, as described, for example, in U.S. 2,991,264 to Monroe et al., or various other compounds, e.g., biphenyl.

Use of nucleating agents in the compositions of this invention often accelerates the rate at which ultimate strength of the shaped products is developed. Use of such agents also tends to result in improvement of product properties when product shaping procedures are carried out at relatively high temperatures.

The invention will be better understood from the following examples which, however, are presented only for purpose of illustrating preferred modes of the invention and the results obtainable by the invention and are not to be considered as limiting the invention. Parts and percentages stated are by weight unless otherwise indicated.

Example 1

Modified polypropylene product of this invention is typically prepared according to the following method:

Into a 1.5 liter agitated pressure vessel there is placed a mixture of 1200 ml. (milliliters) heptane, 4 mmols. (millimoles) titanium trichloride and 12 to 16 mmols of aluminum diethyl chloride. The titanium trichloride used is suitably prepared either by reduction of titanium tetrachloride by means of aluminum metal or by reduction of titanium tetrachloride by means of aluminum triethyl. To the reaction vessel there is added from 50 to 100 ml. of hydrogen, depending on the I.V. which is desired for the final product. For the sake of a specific illustration, 60 ml. of hydrogen is added, measured at atmospheric temperature and pressure. The autoclave is closed and heated to a temperature of 60° C. Propylene is then rapidly added, at the rate of 7 grams per minute, until the pressure in the reaction vessel is 45 p.s.i. About 60 grams of propylene is thus added. Thereafter the rate of propylene addition is decreased to 2 grams per minute, which maintains this pressure. When 140 grams of propylene has been added the rate of propylene addition is decreased to 1 gram per minute and ethylene addition is commenced at the rate of about one-half gram per minute. Both propylene and ethylene addition are discontinued 10 minutes thereafter. The total amount of propylene thus added is 150 grams and the amount of ethylene added is 5 grams. Agitation is continued for a brief period until the gas pressure begins to drop below 45 p.s.i. At this point a substantial part of the ethylene which has been added has polymerized. The catalyst present in the reaction mixture is then killed by adding 50 ml. of 10% HCl in isopropyl alcohol. Polymer is removed from the reaction slurry by filtration and is washed to free it of catalyst residue. Oxidation inhibitor is then added to the polymer.

The recovered modified polypropylene product has the following properties, mechanical properties being determined on specimens which are compression molded at 220° C. and annealed in sequence at 100° C. for 16 hours and at 23° C. for 24 hours.

Ethylene content, percent wt. _____ 2.4
Intrinsic viscosity, dl./g. _____ 3.0
Yield strength, p.s.i., measured at 0.2 in./min. ____ 3800
Elongation at yield, percent _____ 10
Tensile modulus, p.s.i. _____ $2.25 \times 10^5$
Impact strength, notched Izod, ft. lb./in.:
   23° C. _____ No break
   0° C. _____ 1.4
Hardness, Rockwell M _____ 16

Example 2

The following illustrates an alternative method of preparing modified polypropylene product of this invention.

Into a 12 liter agitated pressure vessel there is placed a mixture of 6 l. (liters) heptane, 24 mmols (millimoles) titanium trichloride and 84 mmols of aluminum diethyl chloride. The titanium trichloride used is suitably prepared either by reduction of titanium tetrachloride by means of aluminum metal or by reduction of titanium tetrachloride by means of aluminum triethyl. The vessel is brought to a temperature of 45° C. and propylene is introduced into the vessel until 300 g. (grams) have been added. Thereafter propylene addition is continued at the rate of 5 g. per minute and ethylene addition is initiated at the rate of 5 g. per minute. After 27 g. of ethylene are added during a period of 8 minutes, further addition of ethylene is discontinued. After another minute, further addition of propylene is discontinued; the total amount of propylene added at this point is 345 g. The vessel is stirred and maintained at 45° C. for 16 minutes counting from the first addition of propylene. Thereafter the vessel is vented to atmospheric pressure, flushed with nitrogen for 10 minutes and maintained under a nitrogen positive pressure for 30 minutes at a temperature of 45° C. During this period, any monomer retained in the reaction mixture is converted to copolymer. Further propylene addition is then commenced by adding 200 g. to bring the reaction mixture again up to 45 p.s.i.g. pressure. Propylene addition is continued at the rate of 10 g. per minute. After 5 minutes, addition of hydrogen is initiated for molecular weight control. A total of 650 g. of propylene is added over a period of 40 minutes. The catalyst present in the reaction mixture is then killed by adding 6 liters of isopropyl alcohol containing 50 ml. of concentrated aqueous HCl. Polymer is removed from the reaction slurry by filtration and is worked up as in Example 1.

A recovered modified polypropylene product has the following properties:

Ethylene content, percent wt. _____ 2.2
Intrinsic viscosity, dl./g. _____ 3.1
Yield strength, p.s.i. measured at 0.2 in./min. ____ 3520
Elongation at yield, percent _____ 15
Impact strength, notched Izod, ft. lb./in.:
   23° C. _____ 5.2 (hinged)
   0° C. _____ 1.22
Hardness, Rockwell M _____ 11
Insolubility in boiling heptane, percent_____ 82

Example 3

The low temperature impact strength of product prepared according to this invention and its tensile strength were compared with the same properties of various related products. The resulting data are listed below in Table 1. The data are also plotted in part in FIGURES 1 and 2 of the drawing.

In the preparation of all products compared in Table 1 and the drawing, the polymerization was carried out with stereospecific catalysts essentially identical to that used in Example 1. Products A–1, A–2 and A–3 are products according to this invention, made as described in Example 1, in such manner that in A–1 the ethylene content was 2.2%, in A–2 3.0% and in A–3 3.7%. Product B is isotactic polypropylene, prepared without addition of any other monomer. Products C–1 and C–2 were prepared by a type of block polymerization in which the propylene polymerization was periodically interrupted by adding ethylene to be copolymerized with propylene during a brief period, after which ethylene addition was again

TABLE 1

| Method [b] | Product | Yield Strength (at 0.2 in./min.), p.s.i. | Ethylene, Percent Weight | Izod Impact, Notched, at 0° C., ft. lb./in. | | | | | | | | | |
|---|---|---|---|---|---|---|---|---|---|---|---|---|---|
| | | | | Intrinsic Viscosity (dl./g.) | | | | | | | | | |
| | | | | 2.3 | 2.4 | 2.6 | 2.8 | 2.9 | 3.0 | 3.1 | 3.3 | 4.8 | 5.3 |
| This Invention | A-1 | 3,600-4,000 | 2.2 | | | 0.81 | [a] .95 | 1.10 | | 1.8 | 2.5 | | |
| | A-2 | 3,400-3,800 | 3.0 | | 1.21 | | 1.5 | | | 2.6 | 3.8 | | |
| | A-3 | 3,000-3,100 | 3.7 | | | | | | | 5.4 | | | |
| Plain Polypropylene | B | | 0 | 0.2 | | | | | | 0.37 | | 0.61 | |
| Periodic Block Polymerization | C-1 | 3,770 | 2.3 | 0.32 | | | | | | | | | |
| | C-2 | 3,650 | 2.5 | | | | | | 0.45 | | | | |
| Copolymer | D-1 | 1,775 | 4.3 | | | | | | | | | | 5 |
| | D-2 | 3,410 | 2.6 | | 3.7 | | | | | | | | |

| | Phr. | Copolymer/Ethylene in Copolymer, Percent | Intrinsic Viscosity (dl./g.) | | | |
|---|---|---|---|---|---|---|
| | | | 2.5 | 2.8 | 3.1 | |
| Ethylene-Propylene Copolymer Blend | E-1 | 2.2 | 5.3 | 43 | | | 0.67 |
| | E-2 | 2.7 | 5.3 | 53 | | | 0.66 |
| | E-3 | 3.6 | 10 | 41 | | | 0.76 |
| | E-4 | 3.8 | 10 | 43 | | | 0.70 |
| | E-5 | 4.8 | 10 | 53 | | | 0.64 |
| | E-6 | 6.7 | 10 | 77 | | | 0.92 |
| | E-7 | 5.9 | 10 | 65 | .60 | | |
| | E-8 | 5.9 | 10 | 65 | | .78 | |
| | E-9 | 5.9 | 10 | 65 | | | 1.38 |

(Product columns E-3 through E-9 Yield Strength values: 3,600; 3,580; 3,530; —; 3,500; 3,300; 3,100)

[a] Interpolated value.
[b] Samples for testing prepared by compression molding at 220° C. and annealing at 100° C. for 16 hours and at 23° C. for 24 hours.

discontinued. This periodic addition of ethylene was carried out by adding 1 part of ethylene each time after about 25 parts propylene had been added; at least six separate ethylene additions were made during each run; the final polymers contained 2.3 and 2.5% ethylene, respectively. Products D-1 and D-2 were prepared by maintaining a small concentration of ethylene together with propylene throughout a polymerization so that uniform copolymers were produced which contained 4.3% and 2.6% ethylene, respectively. Products E-1 to E-9 were prepared by milling blends of finished highly crystalline propylene with ethylene-propylene copolymer. The blends were prepared by coating polypropylene powder with a solution of the copolymer, drying and then milling on a roll mill at 180-200° C.

It is seen from the data in Table 1, which can be visualized more readily by reference to FIGURES 1 and 2 of the drawing, that product of high impact resistance at low temperature can be readily prepared according to this invention at low intrinsic viscosities. For most practical purposes, propylene polymers having intrinsic viscosities above about 3 are undesirable. Hence, the present invention is shown to solve a serious practical product limitation in an elegant manner not achievable by other methods.

*Example 4*

Further improvements in the modified polypropylene product of this invention can sometimes be obtained by addition of a crystal modifying agent, as illustrated by the following data.

Modified polypropylene product was prepared essentially as described in Example 1 above. The tensile yield strength, impact strength and hardness of specimens which had been compression molded at a temperature of 220° C. were determined. Other portions of the polymer were blended with various amounts of adipic acid. The additive was incorporated in the polymer by adding the acid to the polymer on a hot plastics mill and milling 5 minutes thereafter. Samples of the resulting products were compression molded at 220° C. and then similarly tested for tensile yield strength, impact strength and hardness.

The raw polymer contained in excess of .005% by weight of titanium and .010% by weight of aluminum as residue from the polymerization. Its ethylene content was 2.2% by weight and its intrinsic viscosity 2.5 dl./g.

Data of the tests of the uncompounded polymer and the polymer containing adipic acid are shown in Table 2.

TABLE 2

| Product | Percent weight Adipic Acid | Tensile Yield, 0.2 in./min, p.s.i. | Izod Impact, ft. lb./in. | | Hardness Rockwell M |
|---|---|---|---|---|---|
| | | | 0° C. | 23° C. | |
| A-4 | 0.00 | 3,490 | 0.89 | 3.97 | 11 |
| A-5 | 0.10 | 3,550 | 1.53 | 7H | 15 |
| A-6 | 0.25 | 3,555 | 1.71 | 12H | 15 |
| A-7 | 0.50 | 3,515 | 1.58 | 8H | 14 |

H signifies hinged break.

It is seen from Table 2 that the use of crystal modifying additive resulted in some increase of the tensile yield strength of the polymer and in a substantial increase of the Izod Impact values of the polymer both at 0° C. and at 23° C., as well as some increase in hardness.

Similarly improved results are obtained when in lieu of adipic acid there is used aluminum adipate, aluminum tert. butyl benzoate, aluminum salt of phenyl acetic acid, hexahydrobenzoic acid, and the like, selected from the group of effective compounds disclosed above.

I claim as my invention:

1. As a new composition of matter, a modified polypropylene product consisting of highly isotactic polypropylene polymer chains uninterrupted by ethylene and having ethylene-propylene copolymer attached to one end of at least a portion of the polypropylene chains, the total amount of ethylene units in the polymer product being in the range from 1 to 20% by weight and the proportion of ethylene units in said ethylene-propylene copolymer being between 10 and 90% by weight.

2. As a new composition of matter, a modified polypropylene product consisting of highly isotactic polypropylene polymer chains uninterrupted by ethylene and having ethylene-propylene copolymer attached to one end of at least a portion of the polypropylene chains, the total amount of ethylene units in the polymer product being in the range from 1 to 8% by weight and the proportion of ethylene units in said ethylene-propylene copolymer being between 10 and 90% by weight, said polymer being characterized by a tensile yield strength, measured at 0.2 in./min. on compression molded test specimens, of at least about 3000 p.s.i., and an Izod notched impact test value, measured at 0° C., of at least 0.75 ft. lb./in. of notch for polymer having an intrinsic viscosity between 2 and 3 dl./g., at least 1 ft. lb./in. of notch for polymer having an intrinsic viscosity between 3 and 3.5 dl./g., and at least 2 ft. lb./in. of notch for polymer having an intrinsic viscosity above 3.5 dl./g.

3. A modified polypropylene product according to claim 2, having an ethylene content of from 2 to 5% by weight, based on propylene.

4. A modified polypropylene product according to claim 2, containing from 0.0001% to 1% by weight of a crystal modifying nucleating agent.

References Cited by the Examiner

UNITED STATES PATENTS

| | | | |
|---|---|---|---|
| 2,846,427 | 8/1958 | Findlay | 260—94.3 |
| 2,910,461 | 10/1959 | Nowlin et al. | 260—94.3 |

FOREIGN PATENTS

| | | |
|---|---|---|
| 553,720 | 6/1957 | Belgium. |
| 1,220,947 | 1/1960 | France. |

OTHER REFERENCES

Natta, "Journal of Polymer Science," vol. 34, January 1959, pages 531–549.

Gaylord et al., Linear and Stereoregular Addition Polymers, 1959. Interscience Publishers, page 141.

MURRAY TILLMAN, *Primary Examiner.*

LEON J. BERCOVITZ, *Examiner.*

E. B. WOODRUFF, J. A. KOLASCH,
*Assistant Examiners.*

Notice of Adverse Decisions in Interferences

In Interference No. 96,624 involving Patent No. 3,301,921, G. A. Short, ISOTACTIC POLYPROPYLENE MODIFIED WITH ETHYLENE-PROPYLENE COPLOYMER, final judgment adverse to the patentee was rendered May 17, 1973, as to claim 1.

[*Official Gazette October 23, 1973.*]